(12) United States Patent
Baker (10) Patent No.: US 11,566,866 B1
(45) Date of Patent: Jan. 31, 2023

(54) FIREARM RELEASE APPARATUS

(71) Applicant: Daniel Shane Baker, Whitney, TX (US)

(72) Inventor: Daniel Shane Baker, Whitney, TX (US)

( * ) Notice: Subject to any disclaimer, the term of this patent is extended or adjusted under 35 U.S.C. 154(b) by 225 days.

(21) Appl. No.: 16/989,722

(22) Filed: Aug. 10, 2020

(51) Int. Cl.
*F41C 33/02* (2006.01)

(52) U.S. Cl.
CPC ...... *F41C 33/0263* (2013.01); *F41C 33/0209* (2013.01)

(58) Field of Classification Search
CPC .............. F41C 33/0263; F41C 33/0272; F41C 33/0209; F41C 33/06; F41C 33/0281; Y10S 224/912; Y10S 224/911
See application file for complete search history.

(56) References Cited

U.S. PATENT DOCUMENTS

| | | | | |
|---|---|---|---|---|
| 2,109,734 A | * | 3/1938 | Preneta | F41C 33/0272 224/244 |
| 2,708,537 A | * | 5/1955 | Dec | F41C 33/0272 446/28 |
| 6,585,209 B1 | * | 7/2003 | Mattingly | F41C 33/0245 248/309.1 |
| 7,591,402 B2 | * | 9/2009 | Rassias | F41C 33/06 224/912 |
| 2006/0011680 A1 | * | 1/2006 | Cook | F41C 33/0209 224/243 |
| 2011/0163138 A1 | * | 7/2011 | Tyybakinoja | F41C 33/0263 224/244 |
| 2013/0299543 A1 | * | 11/2013 | Rorick | F41C 33/0263 224/674 |
| 2018/0010884 A1 | * | 1/2018 | Bernkrant | F41C 33/0272 |

* cited by examiner

*Primary Examiner* — Corey N Skurdal
(74) *Attorney, Agent, or Firm* — Jeffrey Roddy (57) ABSTRACT

A firearm release apparatus comprises a carriage with a rail that supports an end block fixed to a proximal end of the rail and adapted to releasably nest with the hammer end of a handgun. At least one spring member joins the proximal end block to a distal block that is adapted to cup the barrel end of a handgun. The gap width between the proximal end block and the distal end block is adjustable because the distal block is movable away from or toward the proximal end block depending on the tension applied to the at least one spring member. A handgun is mountable between the end blocks. A spring exerts force against an end of the rail such that when triggered, the carriage is ejected from an enclosure and the handgun is presented to a user in a ready state where the handgun grip is circumferentially free of obstructions.

6 Claims, 7 Drawing Sheets

FIREARM RELEASE APPARATUS

FIELD OF THE INVENTION

The present invention relates generally to firearm security and more particularly to a firearm release mechanism.

BACKGROUND

Laws regarding the transport of hand guns vary by state. In the state of Texas for example, a non-felon private citizen may transport a hand gun in his own vehicle or a vehicle under his control if the hand gun is stored out of plain sight. With this in mind, hand guns are frequently stored in a glove compartment, under the seat or a console between seats. This presents a problem if the gun owner requires ready access to the hand gun for personal protection because the hand gun cannot be accessed quickly, and in any event, is not stored in a glove compartment or console in a ready state.

Whether firearms are stored in the home or transported in a vehicle, a frequently encountered problem is the lack of ready access to the weapon(s) wherein a key must be turned or biometric identification provided before the door will open and the weapon is available. Biometric identification does not work in all cases and with all people. Keys can become lost or dropped.

It would be desirable to provide an apparatus for the on-demand presentation of a handgun in a ready to use state.

It would be desirable if such an apparatus were configured for placement into a variety of gun compartments.

It would be further desirable if such an enclosure were alternately securable by key, combination lock or other means.

It would be desirable to provide a firearm release apparatus that is readily mountable inside an enclosure whereby ready access to the firearm is obtained by tapping a release.

It would be especially desirable to provide a firearm release apparatus that can be actuated without the use of hands or requiring a user to visually inspect the case as a precursor to activating the release mechanism.

SUMMARY OF THE INVENTION

The present invention is an apparatus allowing the rapid release of a handgun from an enclosure or recess and presentation of the handgun in a ready state where the grip of the handgun is free hanging and in a down position and circumferentially free of adjacent obstructions that would otherwise hinder a natural grasping of the grip and placement of a finger on or inside a trigger guard.

In a general example aspect, a firearm release apparatus comprises a carriage that includes a rail that supports a hammer end block fixed to a proximal end of the rail and adapted to releasably couple with the hammer end of a handgun. The hammer end block is joined by at least one spring member to a barrel end block that is adapted to cup the barrel end of a handgun. A gap width between the hammer end block and the barrel end block is adjustable because the barrel end block is movable away from or toward the hammer end block depending on the tension applied to the at least one spring member. For example, a relatively large handgun such as the ACP45 pistol can be accommodated as well as a Glock 19 because the one or more springs will lengthen or shorten as needed and thereby vary the gap between the two end blocks. Typically, a relatively larger spring is used to store the energy required to eject the entire carriage as a unit; i.e., the rail, the barrel end block, the hammer end block, the one or more springs joining the end blocks and mounted handgun; if any, forceably from an enclosure when one or more catches/safety releases of the enclosure are disengaged. It should be understood that the term spring as used herein may refer to a coil spring, a hydraulic or compressed air spring, an elastomeric spring or any other type spring capable of ejecting the carriage and mounted handgun rapidly.

In a first aspect combinable with any other aspect described herein, the barrel end block and the hammer end block may include a recess adapted to releasably support end portions of a handgun.

In a second aspect combinable with any other aspect, the barrel end block is unconnected to the rail.

In a third aspect combinable with any other aspect, the barrel end block is movable independently of the hammer end block.

In a fourth aspect combinable with any other aspect, a spring joins the movable barrel end block to a fixed object mounted on the rail.

In a fifth aspect combinable with any other aspect, the barrel end block is movable independently of the rail.

In a sixth aspect combinable with any other aspect, the barrel end block includes a recess with a surface configured to abut, but not penetrate the barrel end of a handgun.

In a seventh aspect combinable with any other aspect, it is possible that the rail includes a slot on an underside of the rail and an interior channel adapted to house a coil spring be housed inside the rail and provide compressive force to the barrel end block.

In an eighth aspect combinable with any other aspect, the barrel end block and the hammer end block are made of a material with a low coefficient of friction.

In a ninth aspect combinable with any other aspect, portions of the rail may engage with a spring loaded rail safety catch to temporarily immobilize the rail and to limit forward extension when the stop is disengaged.

In a tenth aspect combinable with any other aspect, a spring loaded handgun support inside an enclosure is accessed by a door that can be either closed and locked, open and unlocked or closed and unlocked whereby the door in the closed and unlocked state can be released by a door release configured to enable ejection of the spring loaded gun support without having to visually inspect the device or feel for a handle, key or combination.

In still another aspect combinable with any other aspect, an enclosure configured for the mounting therein of a spring loaded handgun support includes a door that can be either closed and locked, open and unlocked or closed and unlocked; and, the door in the closed and unlocked state can be released by a push knob whereby the handgun transporting carriage is ejected past the door of the enclosure and the handgun presented to the user in a ready state with the grip free hanging, unencumbered and in a down position.

Advantageously, the geometry of the end blocks permits a mounted handgun to be easily removed by simply grasping by the handle and moving it first, slightly forward, and then in a lateral direction.

Advantageously, the enclosed firearm release apparatus can be used instinctively while permitting a user to keep his or her eyes on a perceived threat.

Advantageously, the firearm release apparatus installs readily in various enclosures adapted for home, business or vehicle use.

The foregoing and other objects, features, and advantages of the invention will become more apparent from the following detailed description, which proceeds with reference to the accompanying figures wherein the scale depicted is approximate.

DETAILED DESCRIPTION OF THE INVENTION

Reference Listing 100 gun holder assembly
101 carriage
102 carriage rail
103a front rail catch
103b rear rail catch
104 hammer end block
105 hammer rail spacer
106 hammer bumper
108 hammer end recess
109 hammer end notch
110 cavity
112 barrel end block
114 barrel end member flange
116 barrel end recess
118 barrel end notch
120 carriage spring
122 rail spring
123 internal rail spring
124 telescoping rail
125 stop
126 slot
200 enclosure
202 enclosure door
204 rail safety catch
206 door release knob
207 door catch
208 enclosure door lock
210 enclosure bottom plate
212 enclosure rail channel
214 enclosure block flange channel
216 enclosure spacer channel
300 firearm

Definitions

In the following description, the term "gun" or "firearm" refers generally to any type of gun, but especially handguns. The term "ready state" refers to a gun presentation that instantly permits a user to grasp the gun grip in a customary manner with a finger on or through the trigger guard and without any circumferential obstructions adjacent the gun grip. Moreover, the gripping action is accomplished without having to unholster, move the grip away from an adjacent surface or otherwise manipulate the weapon. The terms "case", "safe" and "compartment" are interchangeable and refer to an enclosure capable of housing at least one firearm and which can be secured when desired. The term "hands free" refers to such features that enable actuation of features of the present invention without the use of the hands. The term "eyes free" refers to such features that enable actuation of a release mechanism without having to divert one's eyes from a perceived threat. The term "lock" can refer to keyed locks, combination locks, biometric type locks; e.g., fingerprint ID, voice identification, punch button locks and other locks which will suggest themselves to those having skill in the art and access to this disclosure. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." U.S. Pat. No. 9,340,163 to Baker which contains information pertinent to the present disclosure is hereby incorporated by reference in its entirety. In case of conflict, the present specification, including explanations of terms, will control. In addition, the materials, methods, and examples are illustrative only and not intended to be limiting.

Figure 1:
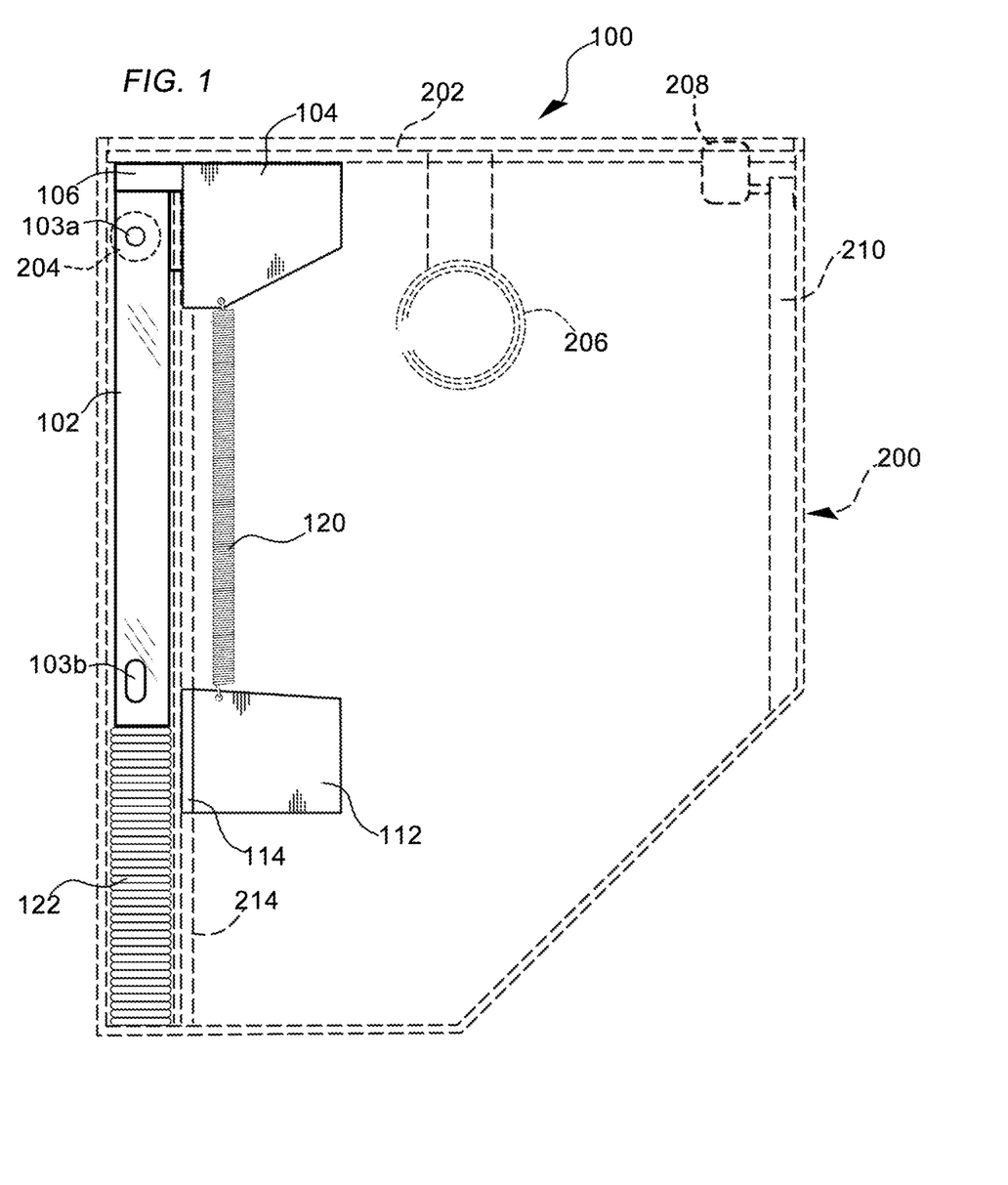
FIG. 1 shows an example implementation according to the present invention installed in an enclosure, the gun holder in a collapsed state.
Figure 2:
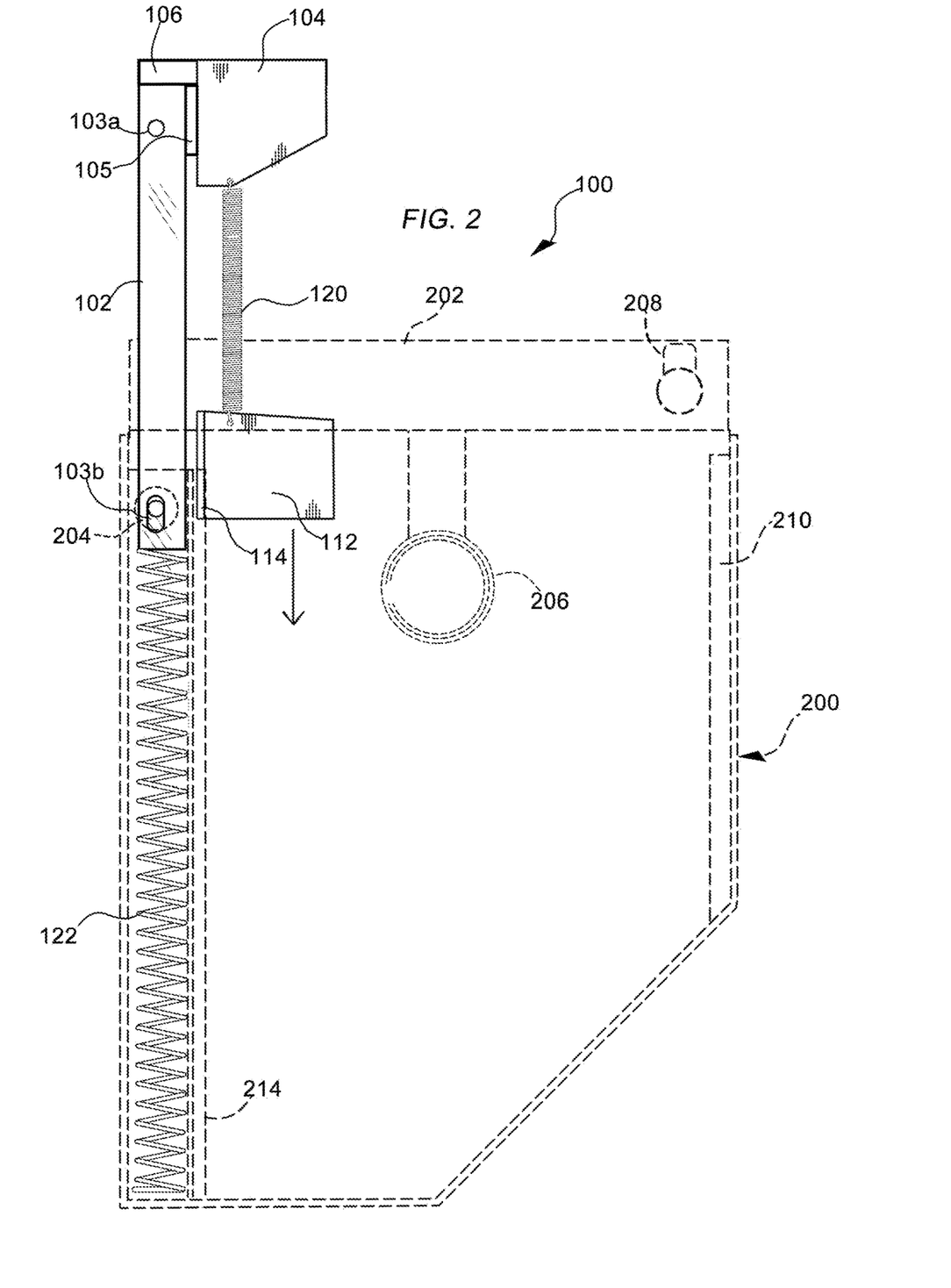
FIG. 2 shows the example implementation of (FIG. 1) in an extended state.
Figure 3:
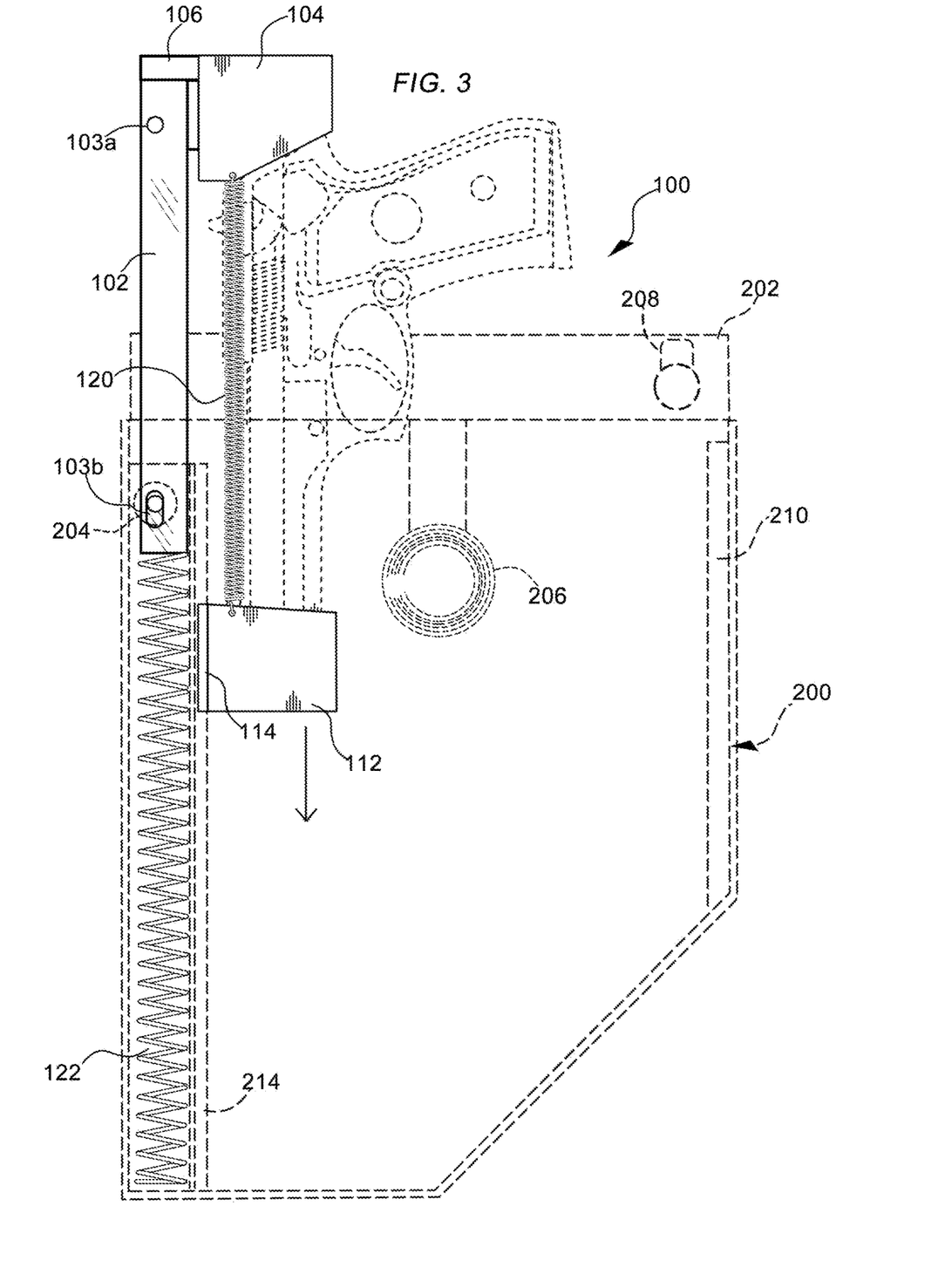
FIG. 3 shows the example implementation of (FIG. 2) in an extended state, the gun holder in a expanded state with a handgun mounted thereon.

Referring generally to FIGS. 1 through 15, a gun holder assembly 100 comprises an extendable gun carriage 101 that includes a spring loaded rail 102, a barrel end block 112, a hammer end block 104, and carriage spring(s) 120 that join the barrel end block to the hammer end block. Hammer end block 104 is typically fixed to an end of rail 102 while barrel end block includes flanges 114 that permit it to slide linearly along channels 214 of enclosure 200 and move independently of rail 102. When carriage spring(s) 120 are unstressed, there is a resting gap between the two end blocks (104, 112). Typically, this gap is configured such that most handguns, whether relatively small or large may be mounted between the blocks where the barrel end of the supported handgun is nested in recess 116 of the barrel end block 112 and the hammer end of the handgun nested in a recess 108 of the hammer end block 104. Accordingly, tension of the carriage spring(s) 120 moves the barrel end block toward the hammer end block such that the handgun is snugly supported at both ends. Enclosure 200 is merely exemplary and persons having skill in the art will appreciate that gun holder assembly 100 may be adapted for mounting into enclosures of various shapes, sizes and configurations. Moving to (FIG. 1), carriage 101 is shown in a retracted state with rail spring 122 compressed and rail 102 secured in the retracted state by rail safety catch 204 that may include a plunge-type pin (not shown) that normally nests within front rail catch 103a; e.g., a small bored recess, preventing carriage 101 from forward movement. In order to prepare the carriage for deployment, rail safety catch 204 is retracted/pulled after which rail 102 moves slightly forward within enclosure 200 and the plunge pin is made to rest on the flat part of the rail. As a second step in preparation for carriage deployment, enclosure door 202 is placed in a ready state by unlocking door lock 208. After retracting the rail safety catch 204 and the door lock 208, door 202 forms the only remaining obstruction preventing carriage deployment. In order to eject the carriage and any supported handgun mounted thereon, door release knob 206 is pressed/tapped which pivots door catch 207. Door catch 207 may be a rocker plate type which is normally biased in a down position flush with a side panel of the enclosure 200 with an overhang that engages an edge of door 202. When the door catch is forced down by pressing knob 206 the end of door catch 207 in contact with the door edge is lifted and frees the door to swing open in response to forward movement of the hammer end block 104 propelled by spring 122 acting on rail 102. Moving to (FIG. 2), during the ejection of carriage 101 the plunge pin of rail safety catch 204 slides along the rail surface and engages with rear rail catch 103b which may be a machined channel or groove on the side of rail 102. Hence, after carriage deployment, rail safety catch 204 must be disengaged; e.g., pulled, prior to reinserting carriage 101 into the enclosure. While in the particular implementations depicted, the rail spring is a coil type other means to project the carriage forward such as a gas piston or elastomerics will be appreciated by those having skill in the art with access to this disclosure which can be employed without departing from the present invention.

Moving to (FIG. 3), carriage 101 is shown fully extended as in (FIG. 2) and handgun 300 is mounted between end blocks (104, 112) where it is snugly retained by the action of spring(s) 120 which forces the end blocks (104, 112) together. Because rail 102 is secured in the fully extended position by the rail safety catch, the hammer end block 104 is likewise immobilized. In order to remove the handgun, a user grips the gun handle in a natural manner and moves the gun slightly toward the barrel end block 112 widening the gap between end blocks (104, 112), and then pivots the proximal end out of the hammer end block 104. The push-pivot-pull movement is a natural elliptical movement, and typically, only 0.5 inch of movement is required to rapidly free the handgun. Also, because the barrel end block 112 is still tensioned by the spring, once the hammer end of the handgun is freed, the spring tension at the barrel block end provides pushing force to augment the user's own retraction of the handgun. Unlike a barrel post retainer, because the barrel end block is non-penetrative, this feature eliminates a pulling motion in line with the rail.

Figure 4:
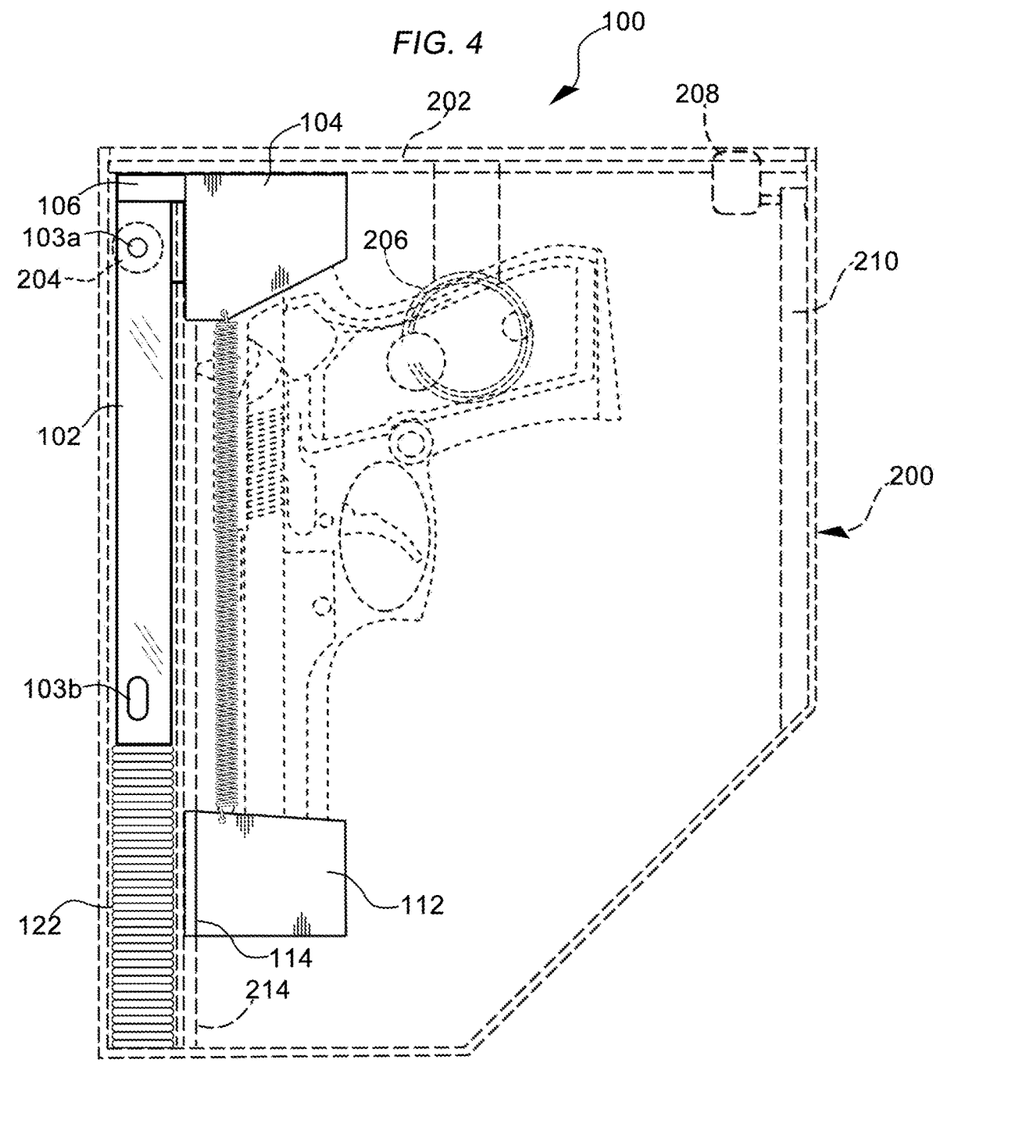
FIG. 4 shows the example implementation of (FIG. 3) in a collapsed state, the gun enclosure in a closed state.

FIG. 4 shows handgun 300 mounted between blocks (104, 112). Carriage 101 is in the fully retracted state inside enclosure 200. Rail safety catch 204 is engaged with the front rail catch 103a and door catch 207 restrains door 202. Spring loaded carriage 101 and mounted handgun 300 are in a secured and retracted state.

Figure 5:
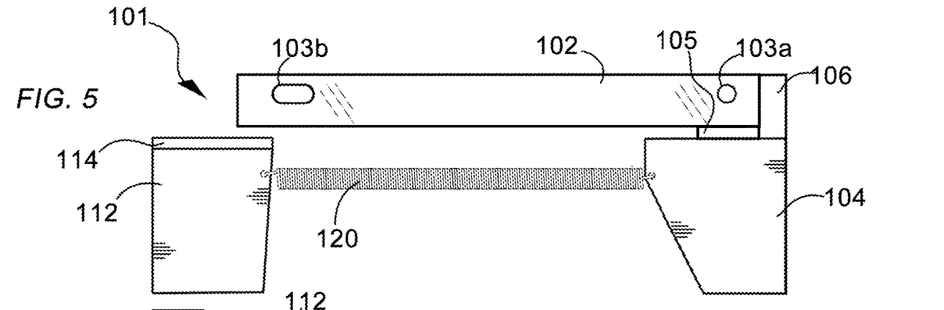
FIG. 5 is a left side elevation of an example implementation of a gun holder in accordance with the present invention.

FIG. 5 is a left side view showing a gun holder assembly that includes rail 102, barrel end block 112, hammer end block 104 and carriage spring(s) 120 connecting the barrel end block to the hammer end block. Barrel end block 112 includes flanges 114 that extend from the sides of the block and configured to slide within channels 214 of an enclosure 200 (FIGS. 1-4). Typically, such an enclosure will include another larger channel to house rail 102 and at the bottom of the channel, a slot to permit hammer end block spacer 105 to enter and move longitudinally along the slot. In the configuration shown, to the extent permitted by spring(s) 120, the barrel end block 112 can move independently of both the rail 102 and the hammer end block 104 while channels 214 constrain the end block 112 to linear travel.

Figures 6, 7:
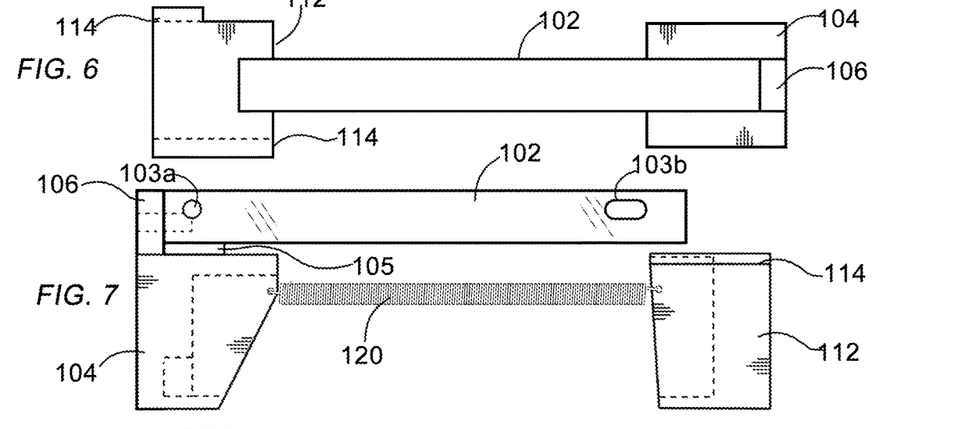
FIG. 6 is a top plan view of the example implementation shown in (FIG. 5)
FIG. 7 is a right side elevation of the example implementation shown in (FIG. 6)

FIG. 6 is a top plan view of the gun holder assembly shown in (FIG. 5).

Figure 8:
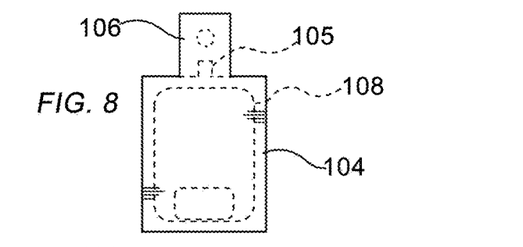
FIG. 8 is a first end view thereof.
Figure 9:
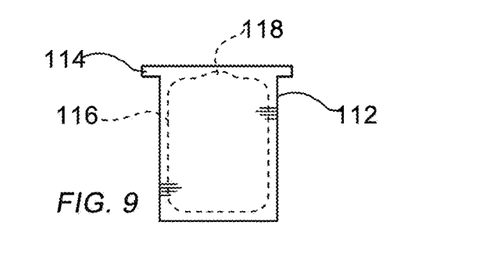
FIG. 9 is a second end view thereof.

FIG. 7 is a right side view of the gun holder assembly shown in (FIG. 5). FIGS. 7-9 show the extent of recessed regions of the end blocks (104, 112).

Figure 10A:
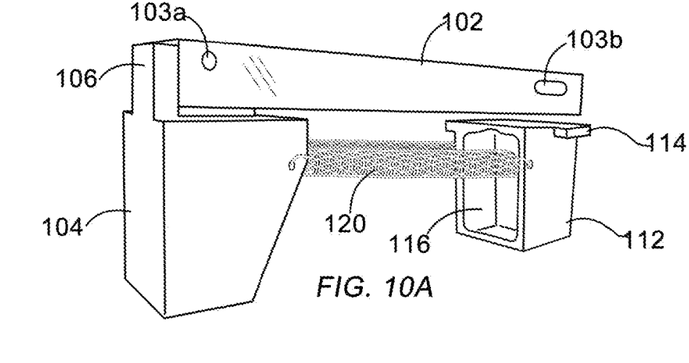
FIG. 10A is a perspective view thereof.

FIG. 10A is a perspective view of the gun holder assembly shown in (FIG. 5) showing recess 116 of barrel end block 112.

Figures 10B, 10C:
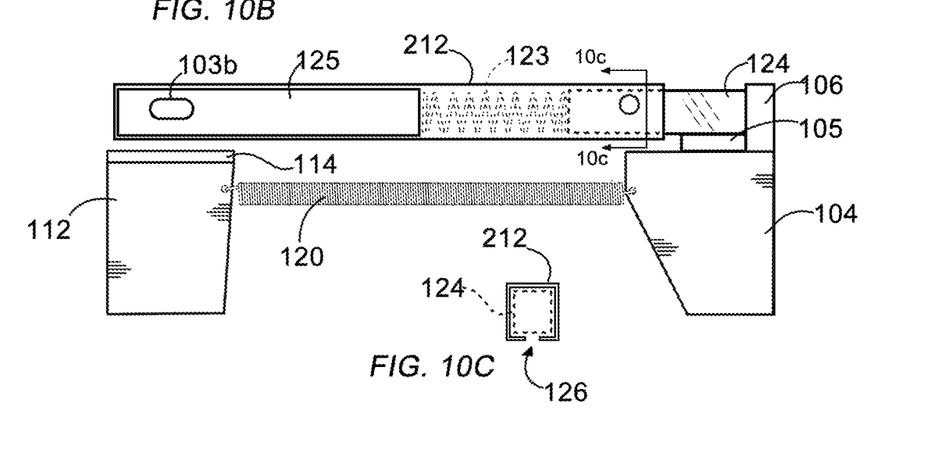
FIGS. 10B and 10C show a reduced size implementation with a shorter stroke length for a rail.

FIG. 10B is a side elevation of a reduced size implementation that includes shorter rail and spring. In the case, a shorter spring is used to telescope smaller rail 124 from rail channel 212.

Figure 11:
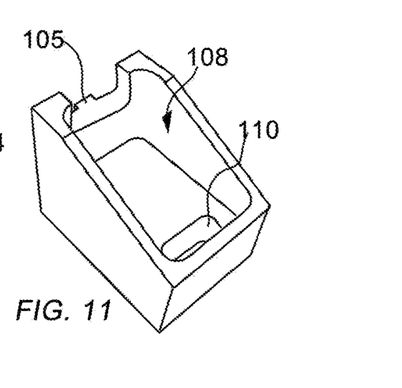
FIG. 11 is a perspective view of a barrel end block thereof.

FIG. 10C is a cross-sectional view taken along lines 10c-10c;

FIG. 11 is a perspective view of the hammer end block 104 showing large recess 108 and cavity 110.

Figure 12:
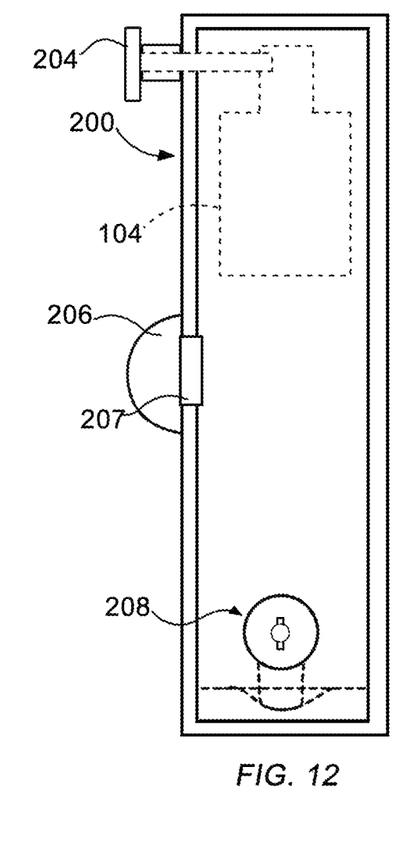
FIGS. 12 and 13 depict steps taken to prepare gun holder assembly for deployment.
Figure 13:
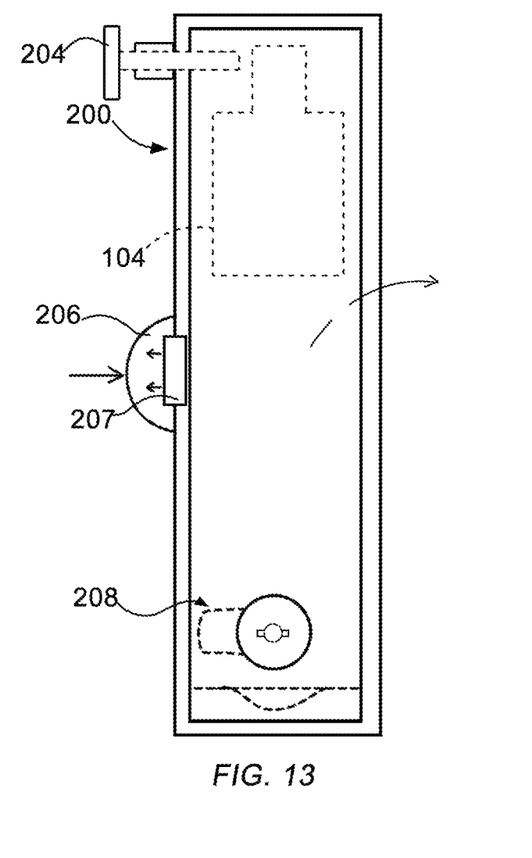

FIGS. 12 and 13 show respectively, an example enclosure 200 in a locked state with rail safety catch 204 engaged, door locked 208 and door catch 207 engaged, and, an unlocked state with safety catch 204 disengaged, door unlocked 208 and door catch 207 disengaged.

Figure 14:
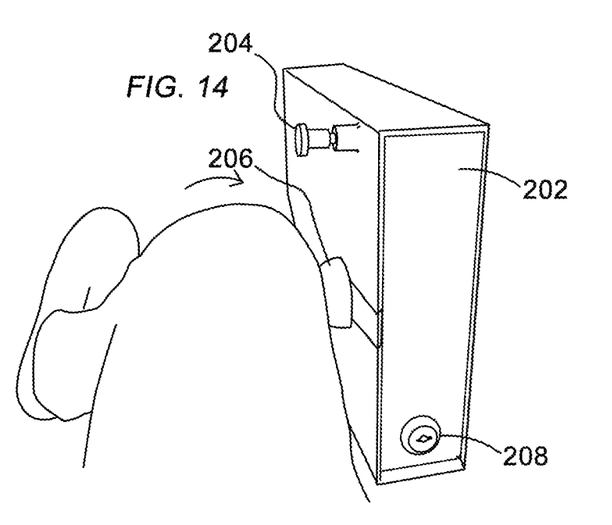
FIGS. 14 and 15 show an example implementation of the gun holder assembly in a secured enclosure.
Figure 15:
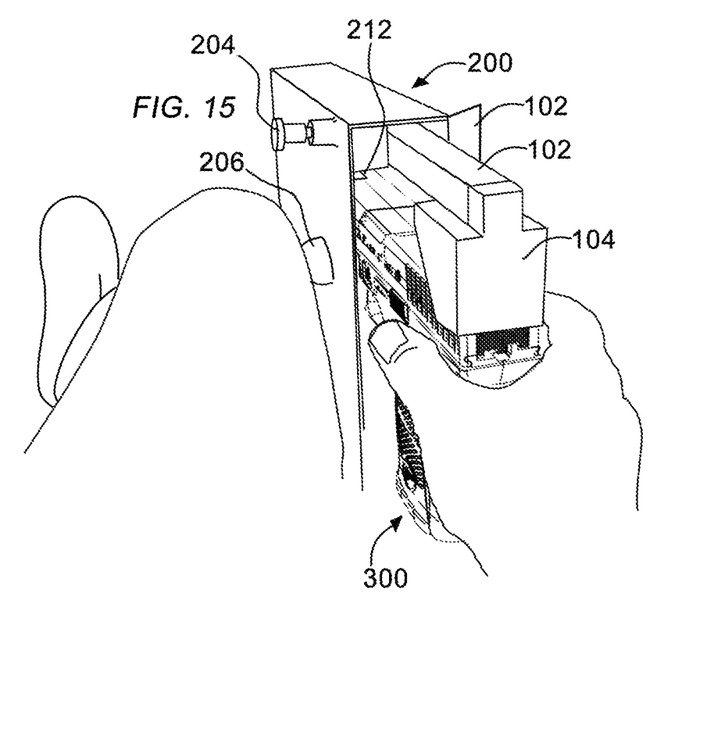

FIGS. 14 and 15 show respectively, an example enclosure in a ready to deploy state and after ejection of carriage 101 with mounted handgun 300 which is accomplished by pressing door release knob 206.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A gun holder comprising:
   a gun carriage, the carriage comprising:
      a barrel end with a surround portion and a first recess portion;
      a hammer end with a surround portion and a second recess portion;
      a rail member between the barrel end and the hammer end;
   the hammer end fixed to a proximal portion of the rail member and the barrel end joined to the hammer end by at least one spring member;
      an adjustable width distance between the barrel end and the hammer end adjusted by moving the at least one spring member from a relaxed state to a tensioned state;
      a rail member spring configured to apply tension against an end portion of the rail member.

2. The gun holder according to claim 1, the hammer end comprising a cavity extending beyond a back wall of the second recess portion.

3. The gun holder according to claim 1 further comprising a case surround.

4. The gun holder according to claim 1 further comprising a safety catch.

5. The gun holder according to claim 1 further comprising a blocking member configured to restrain the gun carriage.

6. The gun holder according to claim 5 further comprising a release member configured to disable the blocking member.

* * * * *